March 28, 1950     J. N. APGAR     2,501,884
TURNTABLE FOR FIFTH WHEEL TRAILER COUPLINGS
Filed Jan. 13, 1949
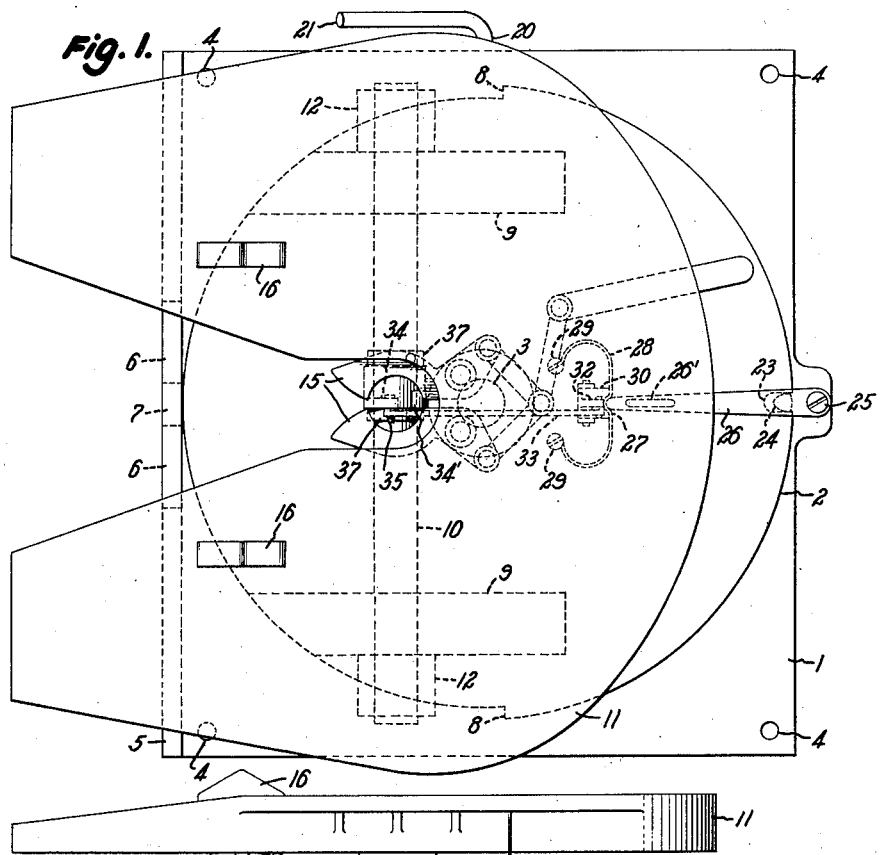
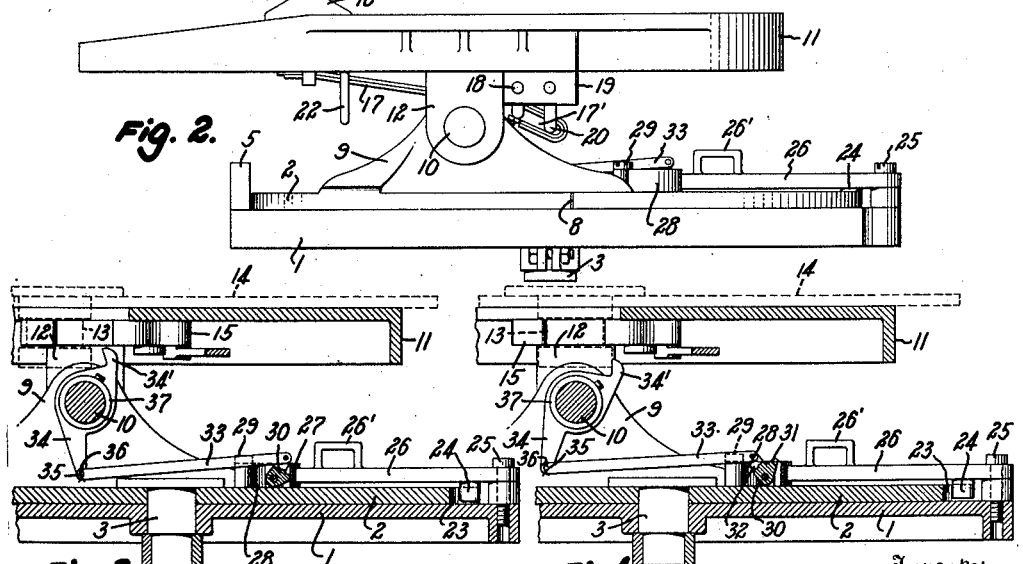
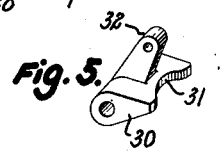

Patented Mar. 28, 1950

2,501,884

UNITED STATES PATENT OFFICE 2,501,884

TURNTABLE FOR FIFTH WHEEL TRAILER COUPLINGS

John N. Apgar, Bound Brook, N. J.

Application January 13, 1949, Serial No. 70,628

7 Claims. (Cl. 280—33.95)

This invention relates to turntables for supporting the tractor-carried elements of a fifth wheel coupling for tractor-semitrailer assemblies, and more particularly to novel mechanism for preventing relative movement of the turntable plates.

The turntable plates of a fifth wheel coupling such as described and claimed in my prior Patent No. 2,442,914, granted June 8, 1948, must be locked against angular movement when a tractor equipped with a turntable is to be employed with a trailer having a fifth wheel plate which is not provided with slots for receiving locking keys carried by the lower fifth wheel plate. It is also desirable to lock the turntable plates against relative movement during the coupling of a tractor to a semitrailer which has a slotted fifth wheel plate.

If the turntable plates are not locked during the coupling operation, the forked lower plate of the fifth wheel may be turned into a position which makes it impossible to complete the coupling when a side edge of the forked opening strikes the king pin of the semitrailer unit. The turntable lock must be released when the latching keys of the lower fifth wheel plate enter slots in the upper fifth wheel plate to lock the fifth wheel plates to each other. It has been proposed to couple each of a pair of latching keys to individual turntable locks, the mechanical connections being such that each turntable lock is released upon movement of the associated latch key into operative position. This is not a satisfactory solution of the problem since minor irregularities in manufacture may block one latching key from movement into latching position simultaneously with the other latching key, whereby only one of the turntable locks is released when the fifth wheel plates are coupled to each other by the actuated latching key. It has also been proposed to provide the turntable locks with a releasing member which is actuated by the king pin during the final movement of the forked lower fifth wheel plate to pick up the king pin. The objection to this automatic release of the turntable lock is that the fifth wheel plates may not be, and in general will not be, in such angular relationship that the latching keys aline with the key-receiving slots of the upper fifth wheel plates when the tractor is backed under the semitrailer to make the coupling. Both the turntable and the fifth wheel are free to move under these conditions and, in view of the lower friction between the turntable plates, all angular movement takes place at the turntable and the tractor-semitrailer assembly may travel a considerable distance before the driver becomes aware of the fact that the rock shaft is at some arbitrary angle to the axis of the semitrailer unit. When he discovers this condition, he must lower the landing gear of the semitrailer to relieve the fifth wheel coupling from load before he can move the lower fifth wheel plate into position to seat the latching keys in the slots of the upper fifth wheel plate.

Another turntable locking system, as described in my copending application Serial No. 31,453, filed June 7, 1948, comprises an impositive latch and a keeper which, when in operative position, converts the impositive latch into a positive lock. The impositive latch affords such resistance to release that, under normal conditions, the turntable is not freed for rotation until the latching keys have secured the fifth wheel plates against relative rotation. In some instances, however, of rough ground in front of the parked semitrailer or of obstructions limiting the angle of approach of the tractor to the parked semitrailer, the impositive latch has been released during the coupling operation and before the latching keys secured the fifth wheel plates to each other.

Objects of the invention are to provide turntables for fifth wheel couplings, and novel turntable locking mechanisms which are not open to the objections of the prior devices. Objects are to provide turntables and locking mechanisms therefor which are positive locks during the major portion of the semitrailer pick-up operation and which are automatically converted to impositive latches at the close of the pick-up operation. More specifically, an object is to provide a turntable and locking mechanism therefor which includes an impositive latch, a keeper for preventing release of the impositive latch, and mechanism operative during the final stage of the pick-up operation to move the keeper into inoperative position.

These and other objects and the advantages of the invention will be apparent from the following specification when taken with the accompanying drawings in which:

Fig. 1 is a plan view of the tractor-carried elements of a turntable fifth wheel coupling embodying the invention;

Fig. 2 is a side elevation of the same;

Fig. 3 is a fragmentary sectional view of the turntable-fifth wheel assembly, and with the upper turntable plate and king pin shown in dotted line in their relative positions just prior to the completion of the coupling operation;

Fig. 4 is a similar fragmentary sectional view of the several parts at the completion of the coupling operation; and Fig. 5 is a perspective view, on a somewhat enlarged scale, of the keeper element of the latch-lock mechanism.

In the drawings, the reference numerals 1 and 2 identify a lower and an upper plate, respectively, which are in surface contact and pivotally connected by a pivot pin 3 to form a turntable. The lower plate is preferably of rectangular shape and provided with openings 4 adjacent the corners for receiving clamping bolts, not shown, by which the turntable may be rigidly mounted upon a tractor. The upper turntable plate is approximately circular, but with its rearward one-half of somewhat smaller radius than the forward section to clear a reinforcing and stop flange 5 which extends upwardly along the rear edge of the lower turntable plate. Openings 6, 6 are cut in the flange 5 at opposite sides of the longitudinal axis of the plate 1 to leave an integral stop rib 7, the openings being of such size that the radial flanges 8, 8 at the junction of the different radius sections of the plate 2 may enter the openings to engage the stop rib 7, thereby limiting the turning movement of the plate 2 to about 180°, i. e. limiting the turning of the tractor to about 90° with respect to the longitudinal axis of the coupled trailer.

Trunnions 9 are mounted on the turntable plate 2 to support a rock shaft 10 with its axis spaced slightly to the rear of the turntable pivot pin 3, and the lower plate 11 of a fifth wheel coupling is journalled on the rock shaft 10 by trunnions 12. The fifth wheel plate is of conventional forked or yoke type for receiving the king pin 13 of the cooperating fifth wheel plate 14 which is carried by a semitrailer. An automatic or semi-automatic clutch 15 for locking engagement with the king pin is mounted on the lower face of the plate 11.

Latch keys 16 for locking engagement in openings of the upper fifth wheel plate are carried by leaf springs 17 secured to a rod or shaft 18 journalled in openings in reinforcing ribs 19 at the lower face of the fifth wheel plate 11, and the key ends of the leaf springs may be turned towards and away from the plate 11 by a crank rod 20 to project the keys 16 above or to withdraw them below the upper surface of the plate 11. Crank rod 20 extends through loops 17' formed by the reversely bent forward ends of the leaf springs 17, and one end 21 of the crank rod is bent at right angles to form an operating handle at an edge of the fifth wheel plate 11. Any suitable means, not shown, may be provided for holding the handle 21 in the illustrated raised position, i. e. with the springs 17 turned clockwise, as seen in Fig. 2, to project the keys 16 above the fifth wheel plate 11. The springs 17 are guided in U-shaped loops 22 which depend below the lower face of the plate 11, and the loops have the additional function of limiting the downward movement of the springs 17 and keys 16 into inoperative position.

The turntable plates 1 and 2 must be locked against angular movement when a tractor is to be backed to couple to a parked semitrailer unit, thereby to retain the rock shaft 10 parallel to the tractor axles. The locking elements comprise a deep notch 23 in the forward edge of the turntable plate 2, and a cooperating lug 24 which is movable angularly about a pin 25 mounted at the forward edge of the lower turntable plate 1, the locking lug being integral with and lying below the pivoted end of a longer latching lever arm 26, which preferably is provided with an eye 26' in which a hooked rod may be engaged for shifting the latch arm. The arm 26 extends radially over the plate 2, when the plates are latched together to seat in the central semicircular bend or recess 27 of a C-shaped leaf spring 28 whose ends are secured to the turntable plate 2 by bolts 29. A keeper 30, or small plate with an edge 31 recessed to conform to the convex face of the bend 27 of spring 28, is pivotally mounted on plate 2 and when turned clockwise as shown in Figs. 1, 2 and 3, embraces the bend 27 snugly to prevent the release of the latch arm 26 from the spring 28 by a flexing of same.

The keeper 30 has an integral arm 32 which is connected by a link 33 to a rocking lever 34 journalled on the rock shaft 10 which supports the lower fifth wheel plate 11. The pivotal connection of link 33 to the lower end of lever 34 comprises a pin 35 carried by lever 34 and a cotter pin 36 which extends through the pin to retain the link 33 upon the same. The rocking lever 34 is centrally located upon the rock shaft 10 by a pair of collars 37 to position the upper end 34' of the rocking lever 34 in the path of the king pin 13 during relative movement of the fifth wheel plates 11 and 14 when the tractor unit is backed towards a parked semitrailer unit to couple to the semitrailer unit.

The rocking lever is so dimensioned and located that the upper end 34' is engaged by the king pin 13 only during the final movement, for example during the last inch or inch-and-a-half of relative movement of the fifth wheel plates 11 and 14 into fully coupled position. In other words, the king pin 13 engages the end 34' of lever 34 to move the keeper 30 into inoperative position, as shown in Fig. 4, only when the coupling of the fifth wheel plates is substantially complete. The previous positive locking of the plates 1 and 2 to each other is thus converted to an impositive latching by the movement of the keeper 30 into inoperative position, but any side pressure thereafter exerted upon an edge of the forked recess of th lower turntable plate 11 by the king pin 13 is of too low an order to effect a release of the impositive latching of the arm 26 to the C-spring 28.

When the coupled tractor-semitrailer is moved forwardly to aline the longitudinal axes of the tractor and semitrailer units, the latch keys 16 will enter the cooperating slots of the upper fifth wheel plate 14 to lock the fifth wheel plates to each other, and when the assembly next moves along a curved path, the turning of the tractor with respect to the semitrailer results in an automatic release of the impositive latching of the turntable plates due to the flexing of the spring 28. The release of the turntable is thus effected without any special action by the driver, but an inadvertent release of the turntable by shock forces during the hook-up is prevented since the turntable plates are positively locked to each other throughout all but the final stage of the hook-up of the tractor and semitrailer units.

In general, tractor units provided with turntable-fifth wheel couplings such as above described will be employed with semitrailer units having upper fifth wheel plates slotted to receive latching keys 16. If a tractor unit having the described turntable-fifth wheel assembly is to be employed with a semitrailer having a fifth wheel plate without openings for receiving the latching keys 16, the turntable plates may be positively locked against rotation by removing the cotter pin 36 and slipping the end of the link 33 from the journal pin 35, thereby preventing movement of the keeper 30 into inoperative position during the hook-up to a semitrailer.

It is to be understood that the invention is not limited to the particular apparatus herein shown and described since the positive-impositive lock and the mechanism for shifting its character at the final stage of the pick-up operation may be varied within wide limits without departure from the spirit and scope of the invention as set forth in the following claims.

I claim:

1. In a tractor-semitrailer coupling, a pair of superposed and pivotally connected turntable plates for mounting upon a tractor, a forked fifth wheel plate for cooperation with a fifth wheel plate to be mounted on a semitrailer unit, means for supporting said forked fifth wheel plate for rocking movement upon the turntable, means for impositively latching said turntable plates to each other with the rocking axis of the fifth wheel plate transverse to the longitudinal axis of the tractor, a keeper movable into operative position to convert said impositive latching means to a positive lock, and means operative during the final movement of said fifth wheel plates into coupling position to move said keeper into inoperative position.

2. In a tractor-semitrailer coupling, a pair of turntable plates for mounting upon a tractor, a fifth wheel plate having a forked slot, means for supporting the said plate upon said turntable plates, said fifth wheel plate being adapted for cooperation with an upper fifth wheel plate on a semitrailer and carrying a king pin for seating in the end of the forked slot of said first fifth wheel plate, latch means for impositively connecting said turntable plates to each other, a keeper having an operative position converting said impositive latch means to a positive lock, and release means actuated during the final stage of movement of said fifth wheel plates into coupled relation to move said keeper into inoperative position.

3. In a tractor-semitrailer coupling, the invention as recited in claim 2, wherein said release means includes a linkage having an element thereof positioned for engagement by said king pin during the final stage of movement of said fifth wheel plates into coupled relation.

4. In a tractor-semitrailer coupling, the invention as recited in claim 2, wherein said means supporting said first fifth wheel plate upon said turntable includes a rock shaft, and said release means includes a rocking lever journalled upon said rock shaft.

5. In a tractor-semitrailer coupling, the invention as recited in claim 4, wherein said release means includes a link connecting said rocking lever to said keeper to move the latter into inoperative position upon actuation of said rocking lever by the king pin.

6. In a tractor-semitrailer coupling, the invention as recited in claim 5, wherein coupling means is provided for removably connecting said link to said rocking lever.

7. In a tractor-semitrailer coupling, the invention as recited in claim 6, wherein said coupling means includes a pivot pin carried by said rocking lever, and a cotter pin extending through said pivot pin for retaining said link on said pivot pin.

JOHN N. APGAR.

No references cited.